United States Patent [19]
Beisch et al.

[11] 3,757,401
[45] Sept. 11, 1973

[54] METHOD OF MANUFACTURING VEHICLE WHEEL TRIM

[75] Inventors: Hans R. Beisch, Amherstburg, Ontario, Canada; William C. Trute, Grosse Pointe Shores, Mich.

[73] Assignee: Sargent Industries of Michigan, Inc., Ypsilanti, Mich.

[22] Filed: Mar. 31, 1972

[21] Appl. No.: 240,182

[52] U.S. Cl............. 29/159 A, 29/425, 113/116 R, 301/37 B, 301/37 R, 301/37 T
[51] Int. Cl.......................... B21d 53/26, B21k 1/28
[58] Field of Search..................... 29/159 A, 159 R, 29/425, 509; 113/116 R; 301/37 B, 37 R, 37 T, 37 C, 37 TP

[56] References Cited
UNITED STATES PATENTS

| | | |
|---|---|---|
| 2,162,733 | 6/1939 | Lyon............................. 29/159 A X |
| 2,190,669 | 2/1940 | Lyon............................... 29/159 A |
| 2,474,853 | 7/1949 | Lyon............................... 301/37 C |
| 2,674,787 | 4/1954 | Lyon............................... 29/159 A |
| 2,785,777 | 3/1957 | Horn.............................. 301/37 R X |
| 3,006,691 | 10/1961 | Lyon............................. 29/159 A X |

Primary Examiner—Charles W. Lanham
Assistant Examiner—V. A. DiPalma
Attorney—J. King Harness, Charles H. Blair et al.

[57] ABSTRACT

This disclosure pertains to an improved method of manufacturing trim rings for automotive wheels from a single blank of material utilizing the normally-scrapped center portion thereof, such method comprising forming the outer peripheral portion of the blank into a shape approximating that of a trim ring, forming the inner peripheral portion into retention means, separating the two portions and reassembling them into a trim ring assembly. Also disclosed in a novel trim ring.

43 Claims, 18 Drawing Figures

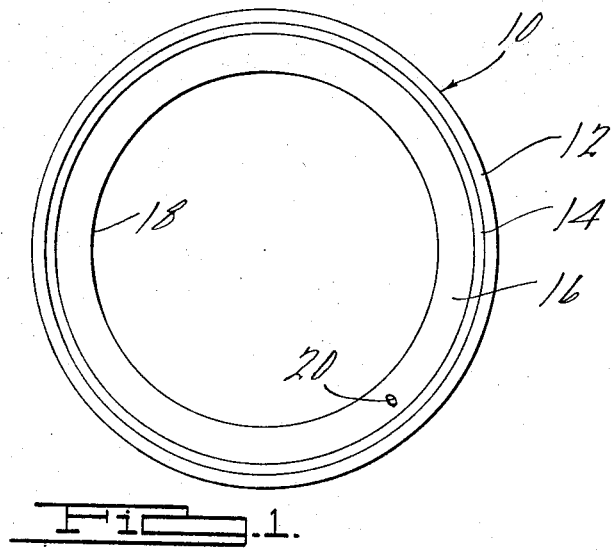
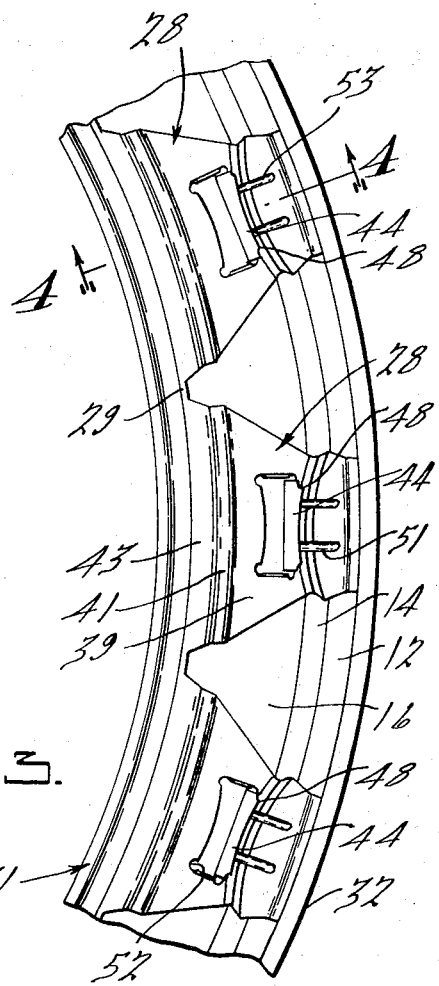
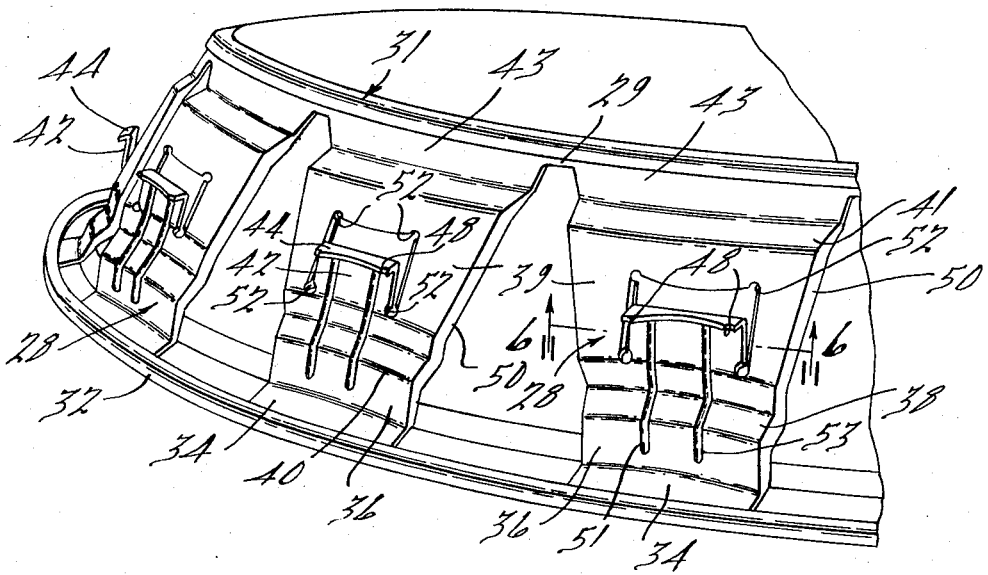

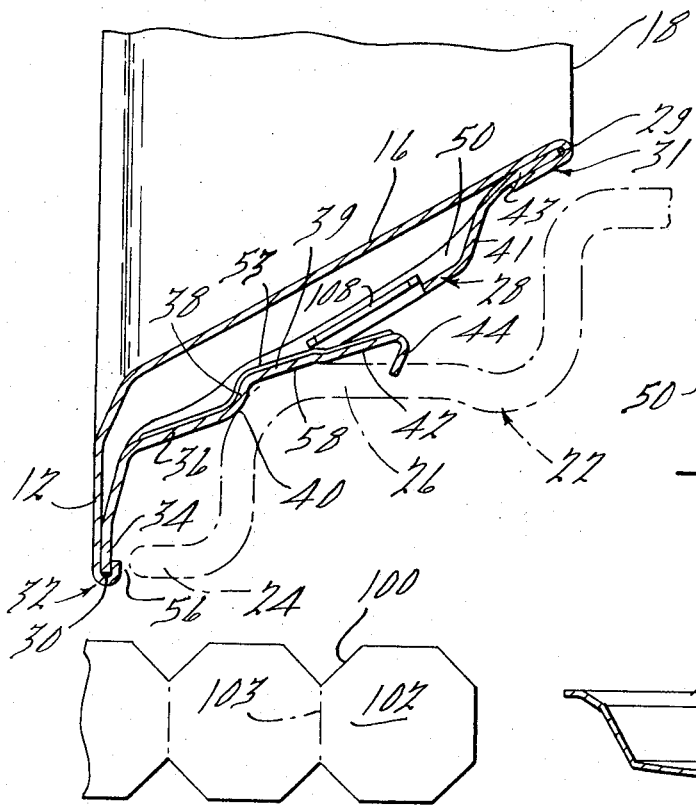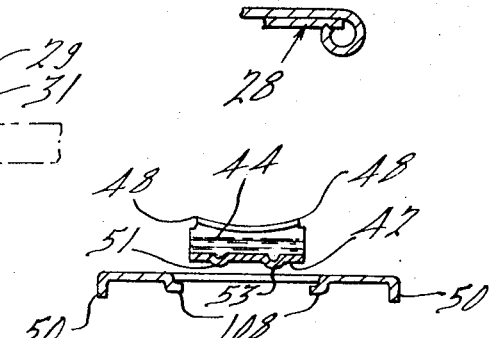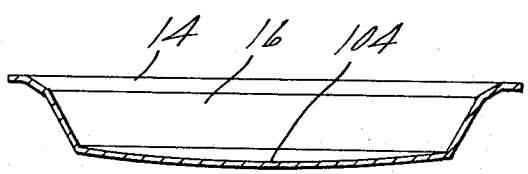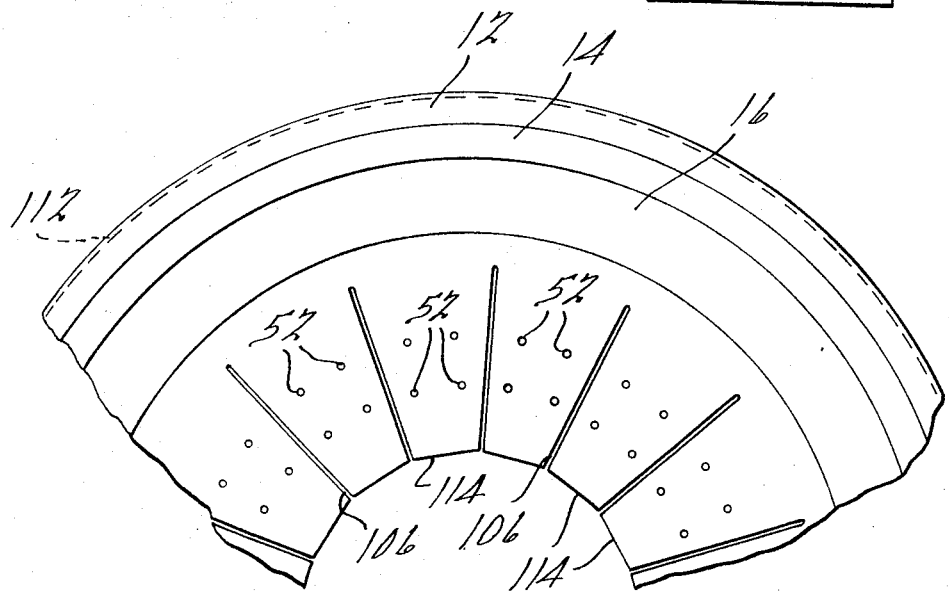

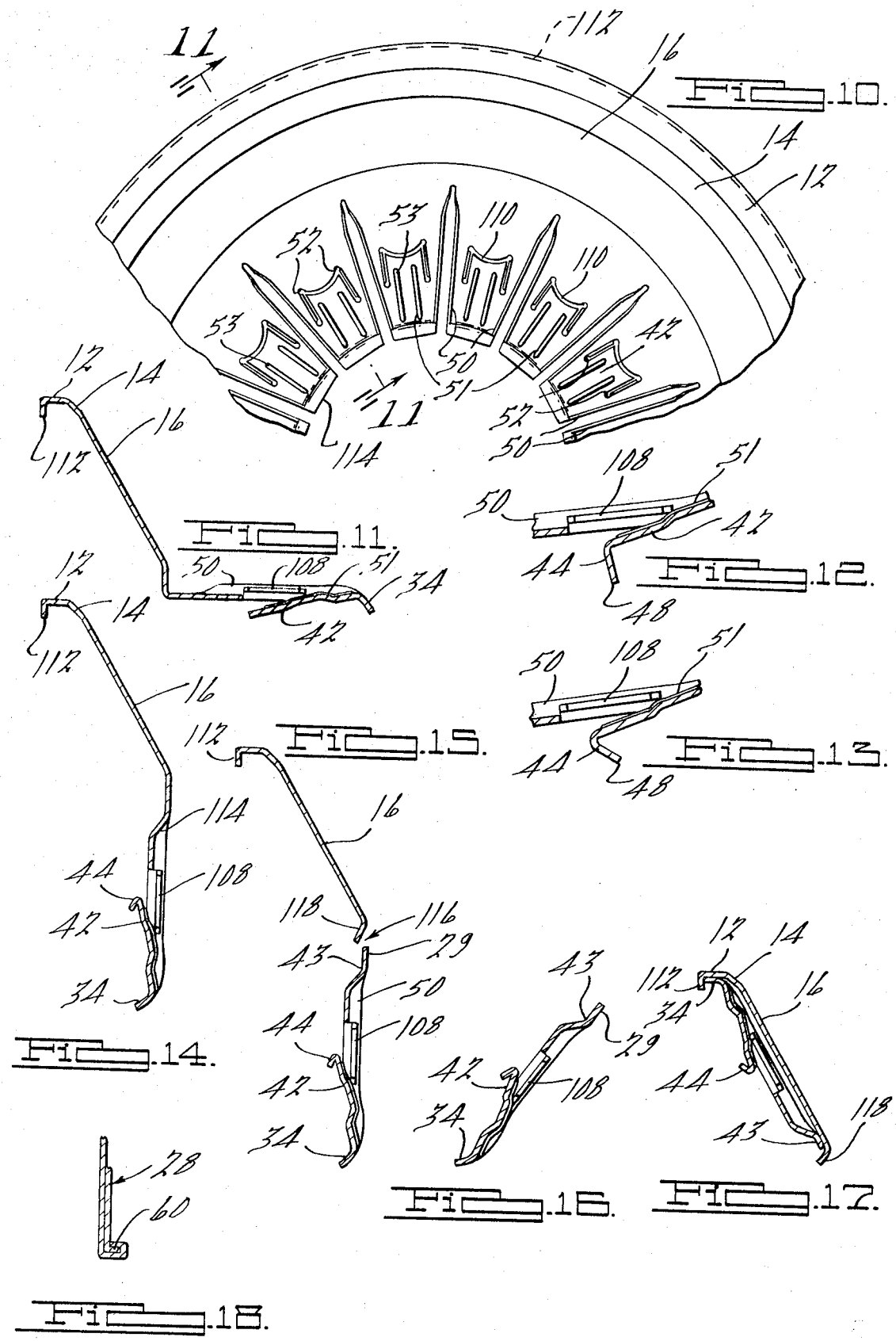

3,757,401

METHOD OF MANUFACTURING VEHICLE WHEEL TRIM

REFERENCE TO RELATED APPLICATION

The present invention is an improvement over the invention disclosed in Ser. No. 146,082 filed May 24, 1971 for Vehicle Wheel Trim and Method of Manufacture, assigned to the assignee of the present application.

BACKGROUND AND SUMMARY OF THE INVENTION

Generally speaking, the function of automotive wheel trim is to decorate and/or protect the automotive wheel, and one of the major problems in the design of a commercially successful article of wheel trim concerns the provision of means for satisfactorily locating and retaining the trim on the wheel which may be mass produced at a minimum cost.

Insofar as trim rings are concerned, one common technique of manufacture is to roll a narrow strip of material into the desired cross-sectional shape, form cut lengths into hoops, and then weld the ends of the hoops together. The resultant article may constitute the oranmental portion of the trim ring, a retention band, or both. Another technique is to stamp them from polygonal or square blanks cut from a relatively wide strip of material. One disadvantage of the rolling process is the difficulty in forming a presentable seam, if it is the ornamental part which is rolled, without inordinately increasing the cost of manufacture. Another is that if it is not the ornamental part which is rolled, but the retention only which is rolled, you have a relatively expensive multi-piece trim ring because at least two different workpieces of approximately the same outside dimension are consumed. One disadvantage of the conventional stamping method is that the relatively large center of the blank must be scrapped. Also such trim rings are usually made in several pieces. Trim rings which are made entirely from one work piece with the retention consisting of a plurality of fingers extending radially and axially outwardly from the inner periphery thereof, are shown in the u.S. Pat. Nos. 2,732,260 and 3,083,060; however, those types suffer the significant disadvantage that because of the extreme relative length of the retention fingers it is almost impossible to achieve or maintain the stiffness necessary to have reliable retention, particularly in the case of massed produced parts. The situation is further aggrevated in the case of a full trim ring which extends to the outer periphery of the wheel. The trim ring of the aforesaid copending application, as well as the one disclosed herein, obviates these disadvantages, and the present invention is concerned primarily with improvements in the method of manufacture of such trim rings.

It is therefore a primary object of the present invention to provide an improved economical method of fabricating a trim ring, and particularly a full trim ring, in which material costs and scrap are reduced by utilization of the normally-scrapped center portion of the blank, in which no materials other than the original blank are used, in which surface finishing operations are deferred until the final operation so that highly sensitive finished surfaces are not subjected to normal fabricating operations and hence a high risk of damage, and which is ideally suitable for mass production techniques.

These and other objects, features and advantages of the present invention will become apparent from the subsequent description and the appended claims, taken in conjunction with the accompanying drawings.

BRIEF DESCRIPTION OF THE DRAWINGS

FIG. 1 is a plan view in the axial direction of the ornamental outer face of a trim ring embodying the principles of the present invention;

FIG. 2 is a perspective view of a portion of the inner face thereof;

FIG. 3 is a plan view in the axial direction of a portion of the inner face thereof;

FIG. 4 is a cross-sectional view taken along line 4—4 of FIG. 3, also illustrating in phantom cross-section a portion of a conventional automotive vehicle wheel;

FIG. 5 is a fragemntary cross-sectional view of a modified technique of fabricating the trim ring of the present invention;

FIG. 6 is a cross-sectional view taken along line 6—6 in FIG. 2;

FIG. 7 is a plan view of the original strip of raw material from which the present trim ring is fabricated in accordance with the present invention;

FIG. 8 is a cross-sectional view of the blank shown in FIG. 7 after certain steps in the method of fabrication have been performed;

FIG. 9 is a plan view in the axial direction of a portion of the blank after certain further steps in the method of fabrication have been performed;

FIG. 10 is a plan view in the axial direction of a portion of the blank after certain further steps in the method of fabrication have been performed;

FIG. 11 is a fragmentary cross-section view taken along the line 11—11 in FIG. 10;

FIGS. 12 and 13 are fragemntary cross-section views showing formation of the retention tooth of the present invention;

FIG. 14, 15, 16 and 17 are fragmentary cross-sectional views illustrating further steps in the method of fabrication of the present trim ring; and FIG. 18 is a fragmentary cross-sectional view of a modified technique of fabricating the trim ring of the present invention.

DETAILED DESCRIPTION OF THE PREFERRED EMBODIMENT

The structure and method of fabrication of the present invention is applicable to automotive wheel trim generally, however because of the utilization of the center portion of the raw material blank for reinforcing and retaining elements they are particularly suited to the manufacture of trim rings, and the present invention is therefore described as embodied in a trim ring and method of manufacture thereof. The principles of the present invention, however, may be readily applied to a wheel cover, i.e. a device also covering the entire center portion of an automotive wheel, by the addition of a suitable ornamental and/or protective element, medallion or the like to the open center portion of the trim ring, using tenchiques well known to those skilled in the art.

Referring more particularly to the drawings, there is illustrated in FIG. 1 a trim ring 10 for an automotive wheel. Trim ring 10 consists generally of an outer peripheral flange 12 adapted to overlie the outer peripheral rim of an automobile wheel, an intermediate portion 14, a major central portion 16 and an inner peripheral edge 18. Trim ring 10 is generally conical in overall configuration, however the entire configuration of the outer face of the trim ring shown is purely exemplary and may be varied for any particular application. A valve stem hole 20 is provided through central portion 16.

As can be seen in FIG. 4, when the trim ring of the present invention is affixed to a conventional automotive vehicle wheel, such as indicated at 22, outer peripheral flange 12 axially overlies the outer rim 24 of the wheel, being primarily radially inwardly and slightly axially outwardly disposed with respect thereto. Wheel 22 is of conventional construction and as partially shown in FIG. 4 its center axis or axis of rotation (not shown) extends horizontally across the drawing in the plane thereof above the figure shown.

Disposed about the axially inner and radially outer side of central portion 16 are a plurality of reinforcing elements 28, the inner ends of which are interconnected by means of an integral annular portion 29 which is rigidly secured to the inner peripheral edge 18 of the trim ring by clinching, spinning, or curling the edge thereof over portion 29, as indicated at 31. The outer ends of reinforcing elements 28, indicated at 30, are rigidly secured to outer peripheral flange 12 preferably by clinching, spinning or curling the outer peripheral edge of flange 12 over end 30 of each element 28, such as indicated at 32.

Each reinforcing element 28 progressively comprises an outer flange portion 34 generally parallel to flange 12, a generally axially extending portion 36, a generally radially extending portion 38, a main body portion 39, a generally radially extending portion 41 and an inner flange portion 43 generally parallel to central portion 16 and integral with annular portion 29. As best seen in FIGS. 2 and 3, the junction of each portion 38 and its adjoining portion 36 consists of an arcuate ridge 40. Projecting from main body portion 39 of each element 28 is wheel retention means comprising a finger portion 42 extending generally axially inwardly from portion 39 and having at the free end thereof a reversely bent tooth 44 extending in a direction which is primarily radially outwardly but having a slight axially outward component. The free edge of tooth 44 is arcuate whereby two wheel engaging points 48 are formed at opposite ends thereof. The side edges of elements 28 are each provided with radial flanges 50 to increase the stiffness thereof. Additional ribs or ridges 51 and 53 may be provided to obtain the stiffness desired. In order to relieve stresses and reduce the possibility of fracture, stress relieving holes 52 are provided at each juncture of the edges of the material from which each finger 42 is formed. In addition, offset flanges 108 are formed along the side edges of the openings from which each finger 42 is formed and in a direction away from the finger. The provision of flanges 108 reduces the chances of a finger engaging and being restrained by the edges of the hole from which it was formed.

As best seen in FIG. 4, the trim ring is retained on the wheel by virtue of the biting engagement of points 48 into intermediate flange 26 of the wheel. In FIG. 4 finger 42 and tooth 44 are shown in an unstressed condition and the wheel is shown in phantom. As can be seen from the illustrated relationship of the parts, when the trim ring is fixed axially on its wheel, fingers 42 will be resiliently deflected inwardly and the stress thus created in all of the fingers will serve to urge all of the points 48 into biting engagement with the wheel to retain the trim ring thereon. Because of the rake angle of each tooth 44 with respect to its finger 42 outwardly axial movement of the trim ring with respect to the wheel tends to cause points 48 to bite deeper and thereby resist such movement. This prevents accidental disengagement from the trim ring from the wheel. On the other hand, fingers 42 are sufficiently flexible that the trim ring may be pried from the wheel by inserting a prying tool between flange 12 and outer rim portion 42 of the wheel.

Because each finger 42 is relatively short in the axial direction, it may easily be made sufficiently stiff to provide reliable retention. This stiffness may of course be varied in designing a trim ring by varying the width and length of the finger. This is in part possible because of the stiffness of element 28 which serves as an anchor. Similarly, tooth 44 is sufficiently short in the radial direction that it is substantially rigid with respect to its finger 42. These features are significant in providing reliable retention which may be economically mass produced on a repeatable basis, i.e. without being adversely subject to variances in normal manufacturing tolerances.

Although teeth 44 are instrumental in retaining the trim ring on the wheel, arcuate ridges 40 and adjacent body portions 39 are are primarily responsible for locating the trim ring with respect to the vehicle wheel. As can be seen in FIG. 4, each arcuate ridge 40, or at least the ends thereof, because of its curvature, engage the arcuate portion of the wheel intermediate flange 26 and rim 24, such engagement serving to axially position the trim ring with respect to the wheel in such a way that a small gap 56 of uniform dimension is provided about the wheel periphery between flange 34 and wheel rim 24, in order to facilitate the insertion of a conventional wheel weight clip. The arcuate shape of ridge 40 also serves to further stiffen each element 28. The trim ring is radially located with respect to the vehicle wheel by the engagement of each portion portion 39, adjacent ridge 40, with intermediate flange 26 of the wheel, as indicated at 58. The inherent strength of the trim ring resulting from the cross-sectional configuration thereof, i.e. the provision of a reinforcing element rigidly secured at both ends to the outwardly facing portion of the trim ring to form a continuous hollow section, provides a strong support structure for the axial locating means, radial locating means, and retention means of the trim ring of the present invention. It has been discovered that sixteen elements 28, each with retention means, have given very satisfactory results in a trim ring for a 15" wheel, however this number is not believed critical and variations therefrom are believed to yield satisfactory results.

Several modifications of the structure which may be desired in a particular application are those shown in FIGS. 9 and 18. If a given application requires additional fastening strength at the juncture of either the inner or outer ends of elements 28 and the remainder of the trim ring, such may be accomplished by curling the face material over the end of element 28 as shown in FIG. 5, or by flanging the edge of the element in the manner shown at 60 in FIG. 18 prior to the clinching, spinning or curling operation.

One of the primary advantages of the trim ring of the present invention is its suitability to an economical method of manufacture, in significant part due to the fact that the present trim ring may be fabricated from a single blank of raw material no greater in size than the blank from which known trim rings are fabricated, without requiring the addition of further material for the hidden supporting, locating and/or retention structure. This is because such structure in the present trim ring is fabricated from that material present in the center of the blank which in conventional processes is scrap. As a consequence, not only is the scrap rate reduced but the need for additional materials is obviated.

A method of fabrication of the present wheel trim is set forth below, with particular reference to FIGS. 7 through 17. Each of FIGS. 11-17 shows a cross-section only of the left hand portion of the trim ring, the center axis of the trim ring being vertically disposed in the plane of the drawing to the right of each sectional view. The input raw material is in the form of a strip or coil of stainless steel or other material having similar decorative and protective characteristics and suitable for appropriate finishing. The strip is slightly wider than the developed cross-section of the completed trim ring. The first operation formed is that of notching the strip as at 100 in FIG. 7 to define successive blanks 102 which are separated by a cutting operation from the coil along a line 103 and then drawn in one or two strikes into the cross-sectional configuration shown in FIG. 8. As will be noted in FIG. 8, the central area 104 of the workpiece is slightly dished. This is for the purpose of work hardening the metal in this area, in addition to that material which is more severely drawn, to achieve a trim ring having the desired stiffness. The next step, illustrated in FIG. 9, is to trim the outside diameter and flange it at 112, cut the slots at 106, trim the inside diameter at 114 (preferably with straight edges) and punch holes 52. This can be done in a single press operation. As shown in FIGS. 10 and 11, the next step is to form flanges 50 on the sides of each segment, lance out the retention fingers 42 at 110 to the preliminary shape shown, flange the edges of openings 110 from which the fingers are lanced with offset flanges 108, form the inner peripheral edge downwardly to form portions 34, and form stiffening ribs 51 and 53; all in a single press operation if desired. A restrike of the blank is then made to bend the retaining teeth 90°, as shown in FIG. 12, after which a further restrike reversely bends the teeth to the final position shown in FIG. 13. Thereafter, the inner annular portion of the blank which ultimately forms reinforcing elements 28 is flanged or wiped downwardly, preferably at least 80° from the horizontal, to the approximate position shown in FIG. 14, and the segments which become elements 28 are pushed outwardly to form the offset portion indicated at 114. This offset ultimately becomes portion 41. The workpiece is thereafter severed or slit into two pieces as indicated at 116 in FIG. 15, and the lower portion of the upper piece flanged slightly outwardly to form flange 118. These operations may be performed using a conventional shimmy die or rotary trimmer. The lower piece, which consists of continuous annular portion 29 having a plurality of segments or elements 28 extending downwardly therefrom, is then expanded to the generally conical configuration shown in FIG. 16, the inside diameter being increased slightly from its diameter after the FIG. 15 operation and the included angle of the conical shape being substantially the same as that of the generally conically shaped upper piece, with the inside and outside diameters corresponding generally to those of the upper piece. This lower conical piece is then inverted and nested within the upper piece, as shown in FIG. 17, after which flanges 112 and 118 are folded over portions 34 and 29 respectively, by clinching, rolling or curling, as above noted. As contemplated herein, a clinching operation entails the use of a press to knock over an outer edge or flange and press it flat over an inner member, a rolling operation involves the use of conventional spinning or rolling equipment to roll the edge of an outer member over the edge of an inner member, and a curling operation is performed utilizing a press having a progressive folding die which progressively folds the outer edge of an outer member over and into biting engagement with an inner member. Obviously in a typical mass production operation the lower piece may not end up being assembled to the particular upper piece from which it was separated, however, this is of no consequence since all the respective parts should be of the same size and configuration. Valve stem hole 20 may be pierced at almost anytime, but preferably after the two pieces are separated and prior to finishing. The ornamental portions of the trim ring may be finished by buffing and/or plating, as desired.

One advantage of the present structure and method is that at the time of finishing there is substantial structure to grip in a finishing fixture. Also, it is not necessary to polish and/or plate any surfaces which will not ultimately show. Furthermore, the present process does not require a finishing operation until the product is fully formed, nor does it require the use of finished raw material, thus reducing the likelihood of creating scrap by damaging a finished surface.

Thus, there is disclosed in the above description and in the drawings embodiments of the invention which fully and effectively accomplish the objects thereof. However, it will be apparent that variations in the method and details of construction may be indulged in without departing from the sphere of the invention herein described, or the scope of the appended claims.

What is claimed is:

1. A method of manufacturing trim rings for vehicle wheels, comprising: stamping a plurality of generally circular members out of generally flat sheet material; forming the outer portion of each said member into an approximate trim ring configuration; forming wheel retention means on the inner portion of each said member and forming each said inner portion into a shape complimentary to the configuration of each said outer portion; severing said outer and inner portions of each said member into first and second separate pieces, respectively; and assemblying and connecting each said second piece to one of said first pieces.

2. A method as claimed in claim 1, wherein said severing is performed after formation of said retention means and prior to complete formation of said complimentary shape.

3. A method as claimed in claim 1, further comprising the step of inverting each said second piece with respect to said first piece after severing and prior to assembly.

4. A method as claimed in claim 1, wherein said retention means is formed by lancing fingers out of said inner portion when the latter is disposed generally in a flat plane, said fingers being disposed on one side of said plane and said outer portion being disposed on the opposite side of said plane.

5. A method of manufacturing trim rings for vehicle wheels, comprising: stamping generally circular members out of generally flat sheet material; forming the outer portion of each said member into an approximate trim ring configuration; removing the center of the inner portion of each said member and forming the remainder of said inner portion into a generally cylindrical configuration having wheel retention means thereon; severing said outer and inner portions of each said member into first and second separate generally annular pieces, respectively; and assemblying and connecting each of said second pieces to one of said first pieces.

6. A method as claimed in claim 5, wherein said retention means is formed prior to formation of said generally cylindrical configuration.

7. A method as claimed in claim 5, further comprising the step of expanding each said second piece into a shape complimentary to that of said outer portions, prior to assembly.

8. A method as claimed in claim 7, wherein the severed edge of each said second piece is expanded substantially less than its opposite edge.

9. A method as claimed in claim 5, wherein said retention means is formed by lancing fingers out of said inner portion when the latter is disposed generally in a flat plane, said fingers being disposed on one side of said plane and said outer portion being disposed on the opposite side of said plane.

10. A method of manufacturing trim rings for vehicle wheels, comprising: stamping a plurality of generally circular members out of generally flat sheet material, each said member having a center axis generally perpendicular thereto; cutting a generally circular opening in the center of each said member, said opening being centered about said axis; cutting a plurality of substantially equal length slots extending radially outwardly from the edge of said opening in each said member, thereby defining a plurality of radially inwardly extending segments on each said member, the outer ends of said segments being integral with the outer portion of said member; forming projecting wheel-engaging fingers from the material of a portion of each of said segments on each said member; forming all of said segments and a portion of said adjoining outer portion of each said member into a generally cylindrical configuration concentric with said axis; severing the remainder of said outer portion and said generally cylindrical portion of each said member into first and second pieces, respectively; expanding each said second piece until its inside and outside diameters generally correspond to those of said first piece; and assembling and connecting each of said first pieces to one of said second pieces.

11. A method as claimed in claim 10, wherein said generally circular opening is defined by a plurality of relatively short straight edges.

12. A method as claimed in claim 11, wherein each said slot extends from the intersection of two of said straight edges, whereby said segments have straight inner edges.

13. A method as claimed in claim 10, wherein the severed edge of each said second piece is expanded less than the opposite edge thereof.

14. A method as claimed in claim 10, wherein said slots and opening are cut at the same time on each said member.

15. A method as claimed in claim 10, wherein said fingers are formed on each said member prior to severing and expanding said second piece.

16. A method as claimed in claim 10, wherein said expanding of each said second piece is performed subsequent to said severing thereof.

17. A method as claimed in claim 10, further comprising the step of piercing a valve hole in each said first piece prior to said assemblying.

18. A method as claimed in claim 10, wherein each said member is severed along a circular line concentric with said axis and disposed between the outer ends of said slots and the outer edge of said member.

19. A method as claimed in claim 10, wherein each said second piece is inverted with respect to said first piece after being expanded and prior to said assemblying.

20. A method as claimed in claim 10, wherein said first and second pieces are connected by clinching.

21. A method as claimed in claim 10, wherein said first and second pieces are connected by spinning.

22. A method as claimed in claim 10, wherein said first and second pieces are connected by curling.

23. A method as claimed in claim 10, wherein said fingers are formed on each said segment on each said member prior to the forming of said inner portion into a generally cylindrical configuration.

24. A method as claimed in claim 10, wherein said fingers are formed by lancing them out of said segments.

25. A method as claimed in claim 24, wherein the opposite side edges of the opening from which each of said fingers is lanced are flanged in order to prevent engagement of said fingers with the sides of said opening.

26. A method as claimed in claim 25, wherein said edges are flanged away from said fingers.

27. A method as claimed in claim 10, wherein wheel locating surfaces are formed on each of said segments on each said member prior to said severing.

28. A method as claimed in claim 10, further comprising the step of flanging the sides of each of said segments on each said member to increase the stiffness thereof, prior to said severing.

29. A method as claimed in claim 10, further comprising the step of forming at least one stiffening rib extending along a portion of each said segment and its wheel-engaging finger.

30. A method as claimed in claim 10, wherein said fingers on each said member project outwardly from each said segment when the latter are disposed in a generally cylindrical configuration.

31. A method as claimed in claim 10, wherein said assembled first and second pieces are connected together solely at the inner and outer peripheries thereof.

32. A method as claimed in claim 10, wherein said outer portion of each said member is disposed on one side of an intermediate plane perpendicular to said axis, and wherein said generally cylindrical portion is disposed on the opposite side of said plane.

33. A method as claimed in claim 10, wherein each said first piece is flanged outwardly along the severed edge thereof prior to assembly with one of said second pieces.

34. A method of manufacturing trim rings for vehicle wheels, comprising: stamping a plurality of members out of generally flat sheet material; forming the outer portion of each said member into a first annular piece having at least an approximate trim ring configuration; forming the inner pOrtion of each said member into a separate second piece having an annular configuration; forming wheel retention means on each said second piece; expanding each said second piece into a shape generally complimentary to the configuration of each said first piece; and assemblying and connecting each said second piece to one of said first pieces.

35. A method as claimed in claim 34, wherein said retention means is formed prior to separation of said first and second pieces of each said member.

36. A method of manufacturing wheel trim for a vehicle wheel, including the following steps: providing an annular member with an opening at the center of the annular member to define inner and outer peripheries on the member, forming a plurality of radial slits in the annular member at spaced positions around the inner annular periphery of the member where the slits extend only a partial distance from the inner annular periphery to the outer annular periphery of the member, forming a plurality of retention means in the annular member at positions between the successive pairs of slits at radial distances intermediate the lengths of the slits, separating from the annular member the inner portion of the annular member at a position radially outwardly displaced from the ends of the slits to form an annular body and reinforcing member having a plurality of reinforcing means defined by the slitted portions, and attaching the reinforcing member at its opposite ends to the opposite ends of the annular body.

37. A method as set forth in claim 36 wherein the outer periphery of the annular body is shpaed to retain the inner periphery of the slitted portions of the reinforcing member and the inner periphery of the annular body is shaped to retain the outer periphery of the reinforcing member.

38. A method as set forth in claim 37 wherein the annular member is provided, prior to the slitting, with a generally conical side wall and a generally flat center portion and wherein the flat center portion is radially slitted to extend toward the generally conical side wall.

39. A method as set forth in claim 38 wherein the flat center portion is shaped to stiffen this portion at positions near the inner periphery.

40. A method as set forth in claim 39 wherein the slitted portions of the reinforcing member are retained in crimped relationship with the annular member at the outer periphery of the annular body and wherein the outer periphery of the reinforcing member is retained in crimped relationship with the inner periphery of the annular body.

41. A method of manufacturing wheel trim for a vehicle wheel, including the following steps: providing an annular member having inner and outer annular peripheries, slitting the annular member radially from the inner periphery to a distance intermediate the inner and outer peripheries at spaced positions around the annular periphery of the member, forming the unslitted portion of the member into a conical configuration with the outer periphery forming the base of the conical configuration, forming teeth in the slitted portions of the annular member at positions intermediate along the radial length of the slit and intermediate the distance between adjacent slits, separating the inner portion of the annular member from the outer portion of the annular member at a position beyond the radial ends of the slits to form an annular body and a reinforcing member having a plurality of reinforcing means defined by the slitted portions, and attaching the reinforcing member at its inner end to the outer periphery of the annular body and the reinforcing member at its outer end to the inner end of the annular body.

42. A method as set forth in claim 41, including the following step: shaping the slitted portions of the annular member at positions between the inner periphery of the annular member and the teeth to stiffen the slitted portions at these positions.

43. A method as set forth in claim 42, including the step of: forming the outer periphery of the annular body to provide for a retention of the inner periphery of the reinforcing member by the outer periphery of the annular body and forming the inner periphery of the annular body to provide for a retention of the outer periphery of the reinforcing member by the inner periphery of the annular body.

* * * * *

Notice of Adverse Decision in Interference

In Interference No. 98,917 involving Patent No. 3,757,401, H. R. Beisch, and W. C. Trute, METHOD OF MANUFACTURING VEHICLE WHEEL TRIM, final judgment adverse to the patentees was rendered Mar. 17, 1976, as to claims 1, 2, 3, 4, 5, 6, 7, 8, 9, 10, 11, 12, 13, 15, 17, 18, 19, 20, 23, 24, 30, 31, 32, 33, 34 and 35.

[*Official Gazette June 22, 1976.*]